Patented July 11, 1950

2,514,365

UNITED STATES PATENT OFFICE 2,514,365

PROCESS OF PREPARING HEXAHYDRONAPHTHALENE

Alan Bell, Kingsport, Tenn., assignor to Eastman Kodak Company, Rochester, N. Y., a corporation of New Jersey No Drawing. Application April 14, 1949, Serial No. 87,573

2 Claims. (Cl. 260—666)

This invention relates to a method of preparing hexahydronaphthalene, and more particularly to a method of preparing hexahydronaphthalene having a boiling point of 199.5° C., a density of $d_4^{20}$ 0.9414, and a refractive index $N_D^{20}$ 1.5201.

In my copending application Serial No. 74,694, filed February 4, 1949, I claim the compound 1,4-diacetoxydecahydronaphthalene,

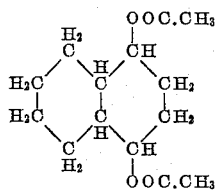

and disclose a method of making it, as follows:

*Example I. — 1,4-dihydroxy-decahydronaphthalene.*—350 g. of 1,4-dihydroxy-5,8-dihydronaphthalene was dissolved in about 1000 cc. of methanol and reduced at 125–150° C. for 6–10 hrs. under 1000–150 lbs. pressure with hydrogen, using Raney nickel as a catalyst. The resulting solution was filtered immediately after being taken out of the bomb, and the methanol was removed under reduced pressure in an atmosphere of nitrogen. The syrup thus obtained consisted of a mixture of the cis- and trans-isomeric forms of 1,4-dihydroxy decahydronaphthalene.

*Example II. — 1,4-diacetoxy-decahydronaphthalene.*—The crude syrup containing the mixture of isomers, prepared in Example I, was refluxed for two hours with 1500 cc. of acetic anhydride. The cooled solution was poured into 3 liters of water. The resulting insoluble oil was separated (ether is used if necessary and the ether solution dried over $CaCl_2$) and distilled. The product is a pale yellow, very viscous oil, B. P. about 150° C./1–2 mm. Yield 400–450 grams.

I have discovered that a hexahydronaphthalene having the physical constants stated in the first paragraph of this specification can be prepared from 1,4-diacetoxy-decahydronaphthalene by passing the latter through a tube heated to a temperature of 400–500° C.

*Example III.—Hexahydronaphthalene.*—350 g. of the mixed cis- and trans- 1,4-diacetoxy-decahydronaphthalene prepared in Example II was passed through a tubular furnace packed with Pyrex glass tubing and heated to 450–500° C. The resulting product was poured into water, and the insoluble layer was separated, dissolved in ether, washed, dried over $CaCl_2$ and distilled. Yield of colorless oil, B. P. 60–65/1 mm., 155 g.

| Analysis | C | H |
|---|---|---|
| | Per cent | Per cent |
| Calcd. for $C_{10}H_{14}$ | 89.5 | 10.5 |
| Found | 89.5 | 10.8 |

B. P. 199.5° C., $d_4^{20}$ 0.9414, $N_D^{20}$ 1.5210.

I have investigated the chemistry of this hexahydronaphthalene by subjecting it to the Diels-Alder reaction, with benzoquinone and with maleic anhydride, as follows:

*Example IV.—Hexahydronaphthalene-benzoquinone adduct.*—7.0 g. of the hexahydronaphthalene prepared in Example III and 5.4 g. of benzoquinone in 50 cc. of benzene were refluxed for four hours. This solution was filtered to remove 1.5 g. of a quinhydron and then evaporated. The resulting yellow crystals were triturated with naphtha and filtered. Yield 6 g. After recrystallization from methanol, the product had a melting point of 95–96° C.

| Analysis | C | H |
|---|---|---|
| | Percent | Percent |
| Calcd. for the addition product | 79.3 | 7.4 |
| Found | 79.0 | 7.8 |

*Example V. — Hexahydronaphthalene-maleic anhydride adduct.*—7.0 g. of the hexahydronaphthalene prepared in Example III and 5.0 g. of maleic anhydride were refluxed for four hours in 50 cc. of benzene. The benzene was evaporated and the residue triturated with naphtha. Yield 5.6 g. After three crystallizations from methanol, the product formed white crystals, M. P. 91° C.

| Analysis | C | H |
|---|---|---|
| | Percent | Percent |
| Calcd. for the addition product | 72.4 | 6.95 |
| Found | 72.3 | 7.2 |

I believe that the hexahydronaphthalene which I have prepared by my novel method is 5,6,7,8,4a,8a-hexahydronaphthalene which may also be called 1,2,3,4,4a,8a-hexahydronaphthalene, 5,6,7,8,9,10 - hexahydronaphthalene, 1,2,3,4,9,10-hexahydronaphthalene or bicyclo- [0.4.4] -decadien-(2,4), according to the system of nomenclature used, and that its benzoquinone and maleic anhydride adducts have the respective structural formulae:

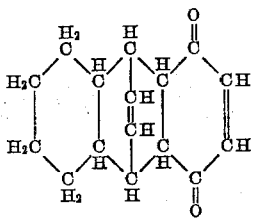

9,10-etheno-Δ²-dodecahydro-1,4-anthraquinone and

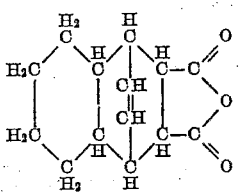

1,4-etheno-decahydronaphthalene-2,3-dicarboxylic anhydride

However, due to the confused state of the literature on the hexahydronaphthalenes, in the attached claims I shall identify the hexahydronaphthalene prepared by my process by its physical constants rather than by the positions of the added hydrogen atoms.

What I claim as my invention and desire to be secured by Letters Patent of the United States is:

1. A process of preparing a hexahydronaphthalene having the physical constants: B. P. 199.5° C., $d_4^{20}$ 0.9414, $N_D^{20}$ 1.5201, which comprises passing 1,4 - diacetoxy - decahydronaphthalene through a tube heated to 400–500° C.

2. A process of preparing a hexahydronaphthalene having the physical constants: B. P. 199.5° C., $d_4^{20}$ 0.9414, $N_D^{20}$ 1.5201, which comprises passing 1,4 - diacetoxy - decahydronaphthalene through a packed tube heated to 450–500° C.

ALAN BELL.

No references cited.

Certificate of Correction

Patent No. 2,514,365                                                           July 11, 1950

ALAN BELL

It is hereby certified that error appears in the printed specification of the above numbered patent requiring correction as follows:

Column 1, line 23, for "150 lbs." read *1500 lbs.*; column 2, line 10, for "1.5210" read *1.5201*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*